United States Patent [19]

Campbell et al.

[11] 3,812,737
[45] May 28, 1974

[54] WORM GEAR CONSTRUCTION
[75] Inventors: Gary Campbell, Gering, Nebr.; Eliot K. Buckingham, Springfield, Vt.
[73] Assignee: Lockwood Corporation, Gering, Nebr.
[22] Filed: Feb. 9, 1973
[21] Appl. No.: 331,336

[52] U.S. Cl. .................................. 74/425, 74/458
[51] Int. Cl. ......................... F16h 1/16, F16h 55/04
[58] Field of Search ............................. 74/425, 458

[56] References Cited
UNITED STATES PATENTS
3,079,808   3/1963   Wildhaber ...................... 74/425 X
FOREIGN PATENTS OR APPLICATIONS
1,188,876   9/1959   France ................................ 74/425

Primary Examiner—Leonard H. Gerin
Attorney, Agent, or Firm—McDougall, Hersh & Scott

[57] ABSTRACT

A gearbox construction comprising a housing rotatably supporting a worm gear and a meshing worm. The worm and worm gear are characterized by a recessed action drive relationship. The worm and worm gear are both formed of iron castings, and the tensile strength of the respective castings is selected so that the worm will have a tensile strength between 75,000 and 105,000 pounds per square inch with the tensile strength of the worm gear being between 45,000 and 55,000 pounds per square inch. The recessed action drive and the combination of materials used for the worm and worm gear provide a gearbox construction suitable for very low speed-high torque applications.

6 Claims, 4 Drawing Figures

PATENTED MAY 28 1974 3,812,737
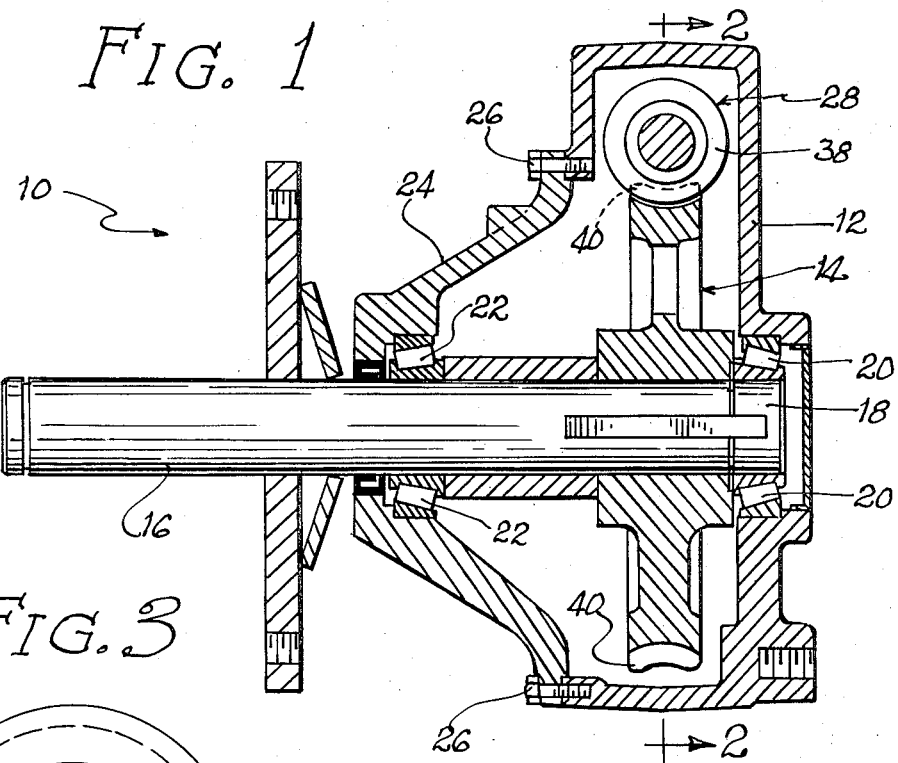
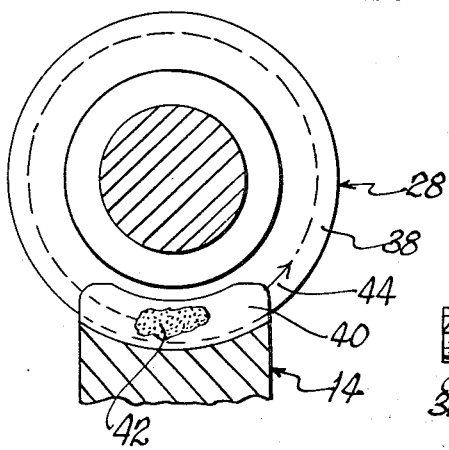
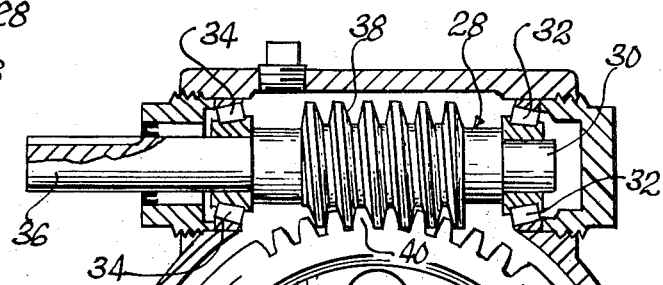
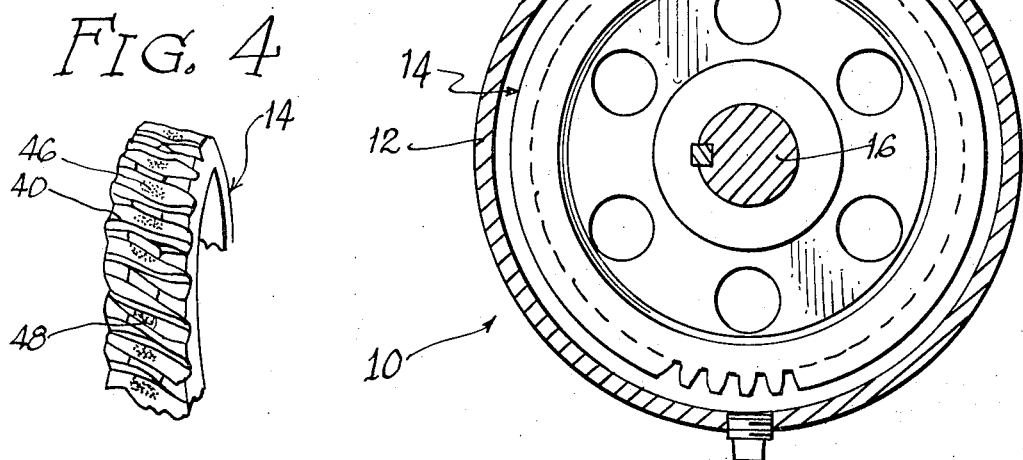

WORM GEAR CONSTRUCTION

This invention relates to an improved gearbox construction. The invention is, in particular, directed to a gearbox construction which is highly suitable for use in applications involving very low speed operations, and very high torque.

The gearbox construction of the invention is suitable, for example, for use in irrigation systems wherein very large sections of irrigation pipe are moved over the ground. In typical systems of this type, the irrigation pipe, carried on suitable motor driven movable supports, extends outwardly along a radius with the structures moving over the ground whereby a circular area is covered.

In order to maximize the efficiency of such operations, relatively long lengths of pipe are employed whereby a high load is placed on each drive motor. For example, torque measurements in the range of 3,000 ounce-inches are typical. The burden on drive mechanisms is particularly great due to the fact that the irrigation operation is carried out on a somewhat sporadic basis; thus, a relatively great amount of starting and stopping will occur over a period of time, and this naturally increases the burden on the drive mechanisms. The fact that the irrigation means are moved at relatively low speeds, typically about one rpm, provides another unusual design consideration.

It is a general object of this invention to provide an improved gearbox construction for use in applications involving low speed and high torque operations.

It is a more specific object of this invention to provide an improved gearbox construction which includes a worm and worm gear combination characterized by substantially improved life under conditions which place an extreme burden on the worm and worm gear.

It is a still further object of this invention to provide an improved gearbox construction wherein the worm and worm gear are characterized by the combination of a gear tooth design and selection of materials which provide uniquely suitable results from the standpoint of satisfactory operating life of the construction.

These and other objects of this invention will appear hereinafter and for purposes of illustration, but not of limitation, a specific embodiment of the invention is shown in the accompanying drawing in which:

FIG. 1 is a vertical sectional view of a gearbox construction having a worm and worm gear arrangement in accordance with the concepts of the invention;

FIG. 2 is a cross-sectional view of the construction taken about the line 2—2 of FIG. 1;

FIG. 3 is an enlarged detail view illustrating the contacting surfaces of the worm and worm gear; and, FIG. 4 is a perspective view of a worm gear and illustrating the wear points of the gear teeth.

This invention generally relates to a gearbox construction wherein a housing rotatably supports a worm wherein a housing rotatably supports a worm gear and a meshing worm. The improvements of the invention generally relate to the tooth arrangements of the worm and worm gear particularly in the fact that a recessed action drive relationship is provided.

The recessed action drive is utilized in conjunction with a worm and worm gear formed from different types of cast iron. Specifically, cast irons having tensile strength in the range of 75,000 to 105,000 pounds per square inch are utilized for the worm. A lower strength cast iron having a tensile strength between 45,000 and 75,000 pounds per square inch is provided for the worm gear. This combination of gear design and material has been found to be uniquely suitable for operations involving low-speed and high torque. When used as drive transmitting means in an irrigation system, gearboxes constructed in accordance with the invention have operated effectively for many times longer than gearboxes of a conventional design.

The drawing illustrates a gearbox 10 comprising a housing 12 supporting the worm and worm gear assemblies. The worm gear 14 is keyed to shaft 16 which has one end 18 supported by bearings 20. Bearings 22 provide support at an intermediate point along the length of the shaft. The housing 12 includes a removable cover 24 which permits access to the interior of the housing. Bolts 26 are provided for this purpose.

The worm 28 includes a shaft end 30 supported on bearings 32. Bearings 34 provide additional support for the shaft, and the shaft extension 36 is adapted to be connected to any suitable input drive.

The teeth 38 of the worm and the teeth 40 of the worm gear mesh for purposes of transmitting the input to the output shaft 16. As indicated, the invention is characterized by a worm and worm gear having a recessed action relationship. The standards for the design of worm and worm gears are well-known, for example, as discussed in the Gear Handbook, First Edition, 1962, particularly chapter 5, pp. 65–69. For purposes of this invention, the recessed action contemplated is achieved by cutting an excessive number of teeth on a pitch diameter designed for a lesser number of teeth. The concepts of the invention can be accomplished with either semi-recessed or full recessed action in this regard.

The worm and worm gear center distances in gearboxes of the invention vary between about 4.75 and 6.5 inches. The number of teeth on a worm gear will vary between about 45 and 55 teeth. With these figures in mind, the recessed action desired is accomplished by adding one or two teeth to the number of teeth considered standard for a particular pitch diameter.

In addition to the gear teeth design, the present invention is characterized by the use of selected materials for forming the worm and worm gear. Specifically, the worm is formed of cast iron with the cast iron being heat treated to provide a tensile strength between about 75,000 and 105,000 pounds per square inch. On the other hand, the worm gear is formed of a material of lower strength, particularly cast iron having a tensile strength between 45,000 and 55,000 pounds per square inch.

In one example of the application of this invention, a gearbox construction of the type illustrated in the drawings was provided with a center distance between the worm and worm gear of 5.167 inches. The worm gear was provided with 51 teeth on a 50-tooth pitch diameter, that is, a pitch diameter measuring 8.66 inches. The worm gear was formed from a cast iron comprising a Meehanite G.A. 50 cast iron having a tensile strength of 50,000 pounds per square inch.

The worm in this example was formed from a 80-6-0-03 cast iron having a tensile strength of 80,000 pounds per square inch. The gearbox was tested by applying an output torque of 20,000 inch pounds through a prony brake running at an input speed of 30 rpm.

After 200 hours of non-stop operation, the worm and worm gear were inspected for wear and hairline cracks. Considering the severe test conditions, the wear was extremely low, and hairline cracks were not evident. When conventional gear sets were tested under the same conditions, the gear sets did not survive the 200-hour operating period. This was true even in gear sets employing a high cost bronze-steel combination of worm and worm gear.

In a second test of the invention, a gearbox having a center distance of 6.09 inches was assembled in accordance with the illustrated construction. In this instance, the worm gear was provided with 53 teeth on a 51-tooth pitch diameter of 10.6 inches.

The worm gear was formed of a G.A. 50 cast iron having a tensile strength of 50,000 pounds per square inch. The worm comprised a Meehanite S.H. 100 cast iron having a tensile strength of 100,000 pounds per square inch. When subjected to test conditions as outlined above, this gear set survived the 200-hour test period without evidence of excessive war or hairline cracks in either the worm or worm gear.

The combination of the recessed action utilized in the gear sets and the material selected has been found to be responsible for the results obtained. Gear sets which do not have this combination have been universally inadequate from the standpoint of performance under the conditions for which the gearbox has been designed. These conditions include gear sets having center distances ranging from about 4.75 to about 6.5 inches, and worm gears having from about 45 to about 55 teeth. The number of teeth is determined by adding one or two teeth to the standard number which would be employed for a particular worm gear pitch diameter.

The testing conducted by applicants reveals that the selection of cast iron having particular properties is necessary for achieving the desired results. Cast iron including the specific types mentioned and which can be heat treated to achieve essentially the properties mentioned are employed. Specifically, the improved results of the invention are achieved where the worm gear has a tensile strength between 45,000 and 55,000 pounds per square inch, with the worm having a tensile strength between 75,000 and 105,000 pounds per square inch .

FIGS. 3 and 4 illustrate schematically the action which characterizes the gear design of the invention. The shaded area 42 of FIG. 3 illustrates the major contact surface of a gear tooth 40 where the worm 28 is rotating in the direction of the arrow 44. The recessed tooth design results in the major amount of friction and wear developing during the "leaving" portion of the driving cycle whereby the adverse affects of tooth engagement are held to a minimum.

FIG. 4 illustrates the positions of shaded areas 46 and 48 on opposite sides of the gear teeth, the teeth having a suitable involute design developed in accordance with standard practice. The particular area of maximum wear which occurs during any given operation will, of course, depend upon the direction of rotation of the worm.

From the standpoint of durability under the high torque and low rpm conditions of gearbox operation in an irrigation system or the like, the gear design and material combination of the invention provide extremely desirable results.

It will be understood that various changes and modifications may be made in the above described construction which provide the characteristics of the invention without departing from the spirit thereof, particularly as defined in the following claims.

That which is claimed is:

1. In a gearbox construction comprising a housing rotatably supporting a worm gear and a meshing worm, the improvement wherein said worm and worm gear are provided with a recessed action drive relationship, said recessed action drive relationship comprising a semi-recessed to a full-recessed relationship, and wherein said worm consists of an iron casting having a tensile strength between about 75,000 and 105,000 pounds per square inch, said worm gear consisting of an iron casting having a tensile strength between about 45,000 and 55,000 pounds per square inch.

2. A construction in accordance with claim 1 wherein the center distances of said gears extend from about 4.75 to about 6.5 inches.

3. A construction in accordance with claim 2 wherein the number of teeth on said worm gear ranges from 45 to 55 teeth.

4. In an irrigation system wherein large sections of irrigation pipes are moved over the ground and wherein motor driven supports are provided for said sections, said motors operating under low speed and high torque conditions, and a gearbox construction for the motors on said supports, said gearbox construction comprising a housing rotatably supporting a worm gear and a meshing worm, the improvement wherein said worm and worm gear are provided with a recessed action drive relationship, said recessed action drive relationship comprising a semi-recessed to a full-recessed relationship, and wherein said worm consists of an iron casting having a tensile strength between about 75,000 and 105,000 pounds per square inch, said worm gear consisting of an iron casting having a tensile strength between about 45,000 and 55,000 pounds per square inch.

5. A construction in accordance with claim 4 wherein the center distances of said gears extend from about 4.75 to about 6.5 inches.

6. A construction in accordance with claim 5 wherein the number of teeth on said worm gear ranges from 45 to 55 teeth.

* * * * *